(12) United States Patent
McCorriston et al.

(10) Patent No.: US 9,657,440 B2
(45) Date of Patent: May 23, 2017

(54) SELECTIVELY SIZED MULTI-PLY CORE STOCK PAPER, METHODS, AND APPARATUS

(71) Applicant: Georgia-Pacific Gypsum LLC, Atlanta, GA (US)

(72) Inventors: Blake McCorriston, Atlanta, GA (US); Gerry Finlayson, Niagara Falls (CA); Vincent B. Thomas, Bogart, GA (US)

(73) Assignee: Georgia-Pacific Gypsum LLC, Atlanta, GA (US)

( * ) Notice: Subject to any disclaimer, the term of this patent is extended or adjusted under 35 U.S.C. 154(b) by 0 days.

(21) Appl. No.: 14/904,302

(22) PCT Filed: Jul. 8, 2014

(86) PCT No.: PCT/US2014/045651
§ 371 (c)(1),
(2) Date: Jan. 11, 2016

(87) PCT Pub. No.: WO2015/006264
PCT Pub. Date: Jan. 15, 2015

(65) Prior Publication Data
US 2016/0130761 A1    May 12, 2016

Related U.S. Application Data

(60) Provisional application No. 61/844,205, filed on Jul. 9, 2013.

(51) Int. Cl.
| | |
|---|---|
| *D21F 5/00* | (2006.01) |
| *D21H 27/32* | (2006.01) |
| *D21H 27/38* | (2006.01) |
| *D21H 17/16* | (2006.01) |
| *D21H 17/17* | (2006.01) |
| *D21H 21/16* | (2006.01) |
| *B32B 29/00* | (2006.01) |
| *D21F 3/02* | (2006.01) |
| *D21G 1/00* | (2006.01) |

(52) U.S. Cl.
CPC ............. *D21H 1/04* (2013.01); *B32B 29/005* (2013.01); *D21F 3/02* (2013.01); *D21F 5/00* (2013.01); *D21G 1/00* (2013.01); *D21H 17/16* (2013.01); *D21H 17/17* (2013.01); *D21H 21/16* (2013.01); *D21H 27/38* (2013.01); *B32B 2250/26* (2013.01)

(58) Field of Classification Search
CPC B32B 29/005; D21F 5/00; D21F 3/02; D21G 1/00; D21H 21/16; D21H 1/04; D21H 27/32
USPC ..... 162/118, 125, 127, 283, 286, 289, 358.1
See application file for complete search history.

(56) References Cited

U.S. PATENT DOCUMENTS

| | | | |
|---|---|---|---|
| 4,311,767 A * | 1/1982 | Kennedy | E04C 2/043 156/44 |
| 6,264,792 B1 | 7/2001 | Kuosa et al. | |
| 7,188,800 B2 | 3/2007 | Bessems et al. | |
| 2007/0196602 A1 | 8/2007 | Kim et al. | |

FOREIGN PATENT DOCUMENTS

| | | |
|---|---|---|
| EP | 0458973 A1 | 4/1991 |
| JP | 2011131464 A | 7/2011 |

OTHER PUBLICATIONS

Search Report and Written Opinion for International Application No. PCT/US2014/045651, mailed Nov. 11, 2014 (14 pages).

* cited by examiner

*Primary Examiner* — Mark Halpern
(74) *Attorney, Agent, or Firm* — Ram W. Sabnis

(57) ABSTRACT

Methods of making a multi-ply paperboard core include providing a number of paperboard furnishes and layering the furnishes to form a multi-ply paperboard web, wherein the two outermost plies are formed of furnish containing no size and the two plies adjacent the outermost plies are formed of furnish containing size. Apparatus for making a multi-ply paperboard core include two or more furnish sources configured to provide a number of paperboard furnishes, wherein at least one furnish source provides furnish containing no size and at least one furnish source provides furnish containing size, and a paperboard forming section wherein the furnishes are layered to form a multi-ply paperboard web in which the two outermost plies are formed of furnish containing no size and the two plies adjacent the two outermost plies are formed of furnish containing size.

12 Claims, 6 Drawing Sheets

SELECTIVELY SIZED MULTI-PLY CORE STOCK PAPER, METHODS, AND APPARATUS

CROSS-REFERENCE TO RELATED APPLICATIONS

This application is a U.S. national stage application of International Application Number PCT/US2014/045651, filed Jul. 8, 2014, which claims priority to U.S. Provisional Application No. 61/844,205, filed Jul. 9, 2013, the entire contents of which are incorporated by reference herein.

TECHNICAL FIELD

The present invention relates generally to the field of paper products, and more particularly to multi-ply core stock paper.

BACKGROUND

Core stock paper is designed specifically for tube and core production, such as for tubes used in retail and commercial rolled towel and tissue products. As used herein, the terms "core" and "tube" are interchangeable. Core stock paper (i.e., the paper or paperboard from which the cores are made) is generally stiff, thick paper and may have a single-ply or multi-ply structure.

As used herein, the term "multi-ply" refers to paper having at least two plies, or layers. For example, the plies may be formed from separate layers of furnish in the papermaking process. As used herein, the term "furnish" refers to the material stock from which the paper plies are made. The furnish may include cellulose, such as cotton, linen, or alpha cellulose extracted from wood pulp, or any other furnish component known to those of ordinary skill in the art.

The furnish may also include size. As used herein, the term "size" refers to a substance that is incorporated into the paper (e.g., mixed in the furnish, added to the top layer of wet furnish during the papermaking process) to change the water absorption and/or wear characteristics of the paper made therefrom. For example, increased amounts of size may result in a reduction of the paper's tendency when dry to absorb liquid (i.e., an increase in the paper's hydrophobicity), and may also affect the finish and surface bond strength, and decrease the surface porosity, of paper made therewith.

Core stock paper is typically manufactured on a papermaking machine, such as a single fourdrinier wire or a single cylinder former, or on a series of formers. Multi-ply papers may be made on multi-cylinder former machines. Generally, these machines and processes limit the amount and/or application site of size incorporated into the paper. For example, fourdrinier machines only allow for the addition of size on the top layer of the paper during the wet process (e.g., after the furnish has been layered on the machine). Multicylinder machines traditionally add size to all of the plies.

Once formed, the paperboard may be wound on a core-winder to produce a tube or core onto which a tissue/towel web is would. To produce the tube, one or more strips of the paperboard is wound on a mandrel and glued. The amount of glue used and the location of glue application may vary based on the paperboard characteristics and the desired tube characteristics. For example, to form a 2-ply tube (i.e., 2 plies of paperboard), glue is typically added to the entire surface of the paperboard during core-forming. For a 1-ply tube, glue is usually added to the edge of the paperboard sheet (e.g., approximately the last quarter of the sheet). The tube may subsequently be cut to the desired length.

Generally, the physical properties of the paper, including basis weight, plybond (ZDT), smoothness, and tensile strength are important in forming a strong, rigid tube that meets the demands of high speed rewinders and also resists crushing from packaging, loading, and transportation/delivery. Also critically important is the glue absorption property of the paper, which dictates the amount of glue necessary, and the distribution of the glue, that may be applied on the core-forming machines during the process of making the tubes.

It would be desirable to provide core stock paper having improved properties.

SUMMARY

In one aspect, methods of making a multi-ply paperboard core are provided, including (i) providing a number of paperboard furnishes, the number corresponding to a desired number of paperboard plies, and (ii) layering the paperboard furnishes to form a multi-ply paperboard web, wherein two outermost plies are formed of paperboard furnish containing no size and two plies adjacent the two outermost plies are formed of paperboard furnish containing size. The methods may also include one or more of the following steps: (iii) pressing the multi-ply paperboard web to remove excess moisture, (iv) calendering the multi-ply paperboard web, (v) drying the multi-ply paperboard web to form a multi-ply paperboard core material, (vi) applying an adhesive to the multi-ply paperboard core material, and (vii) winding the multi-ply paperboard core material to form an adhesive-bonded multi-ply paperboard core.

In another aspect, apparatus for making a multi-ply paperboard core are provided, including (i) two or more furnish sources configured to provide a number of paperboard furnishes, the number corresponding to a desired number of paperboard plies, wherein at least one furnish source provides paperboard furnish containing no size and at least one furnish source provides paperboard furnish containing size, and (ii) a paperboard forming section wherein the paperboard furnishes are layered to form a multi-ply paperboard web in which two outermost plies are formed of paperboard furnish containing no size and two plies adjacent the two outermost plies are formed of paperboard furnish containing size. The apparatus may also include one or more of the following: (iii) a press section configured to remove excess moisture from the multi-ply paperboard web, (iv) a drying section, (v) a calender section configured to smooth the multi-ply paperboard web and form a multi-ply paperboard core material, and (vi) a coring section configured to receive the multi-ply paperboard core material, apply an adhesive to the multi-ply paperboard core material, and wind the multi-ply paperboard core material to form an adhesive-bonded multi-ply paperboard core.

In yet another aspect, multi-ply paperboard cores made from the methods and apparatus described herein are provided.

BRIEF DESCRIPTION OF THE DRAWINGS

Referring now to the drawings, which are meant to be exemplary and not limiting, and wherein like elements are numbered alike.

DETAILED DESCRIPTION

Disclosed herein are methods and apparatus for making multi-ply paperboard cores, such as are used in rolled paper and tissue products. The cores are formed from selectively sized multi-ply core stock paper in which the outermost plies of the paper are formed from furnish containing no size and the plies adjacent the outermost plies are formed from furnish containing size. It has been found that this paper advantageously allows for the use of a decreased amount of glue while making cores therefrom, without sacrificing bonding strength.

Methods of Making Paperboard Cores

In certain embodiments, methods of making a multi-ply paperboard core include providing a number of paperboard furnishes and layering the paperboard furnishes to form a multi-ply paperboard web, wherein the two outermost plies are formed of paperboard furnish containing no size and the two plies adjacent the two outermost plies are formed of paperboard furnish containing size.

For example, the number of paperboard furnishes may correspond to the desired number of paperboard plies. For example, the number of paperboard furnishes may be less than the number of paperboard plies, such that one furnish is used to provide the plies without size and/or one furnish is used to provide the plies containing size.

Figure 1:
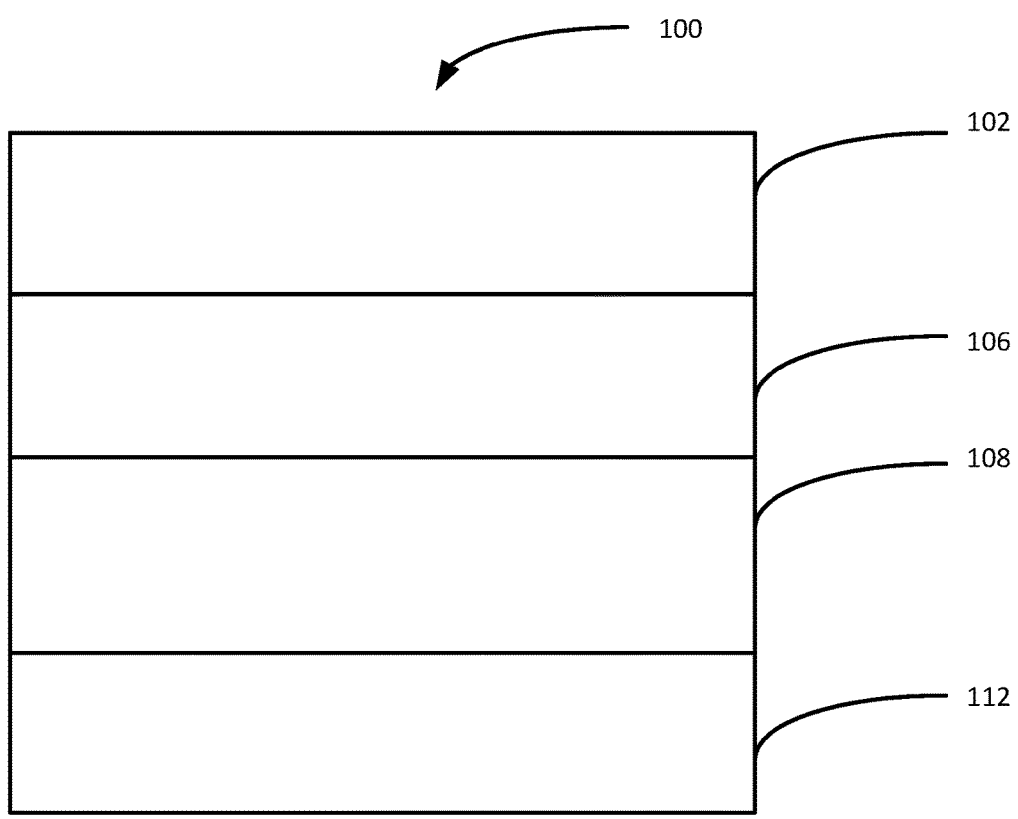
FIG. 1 is a cross-sectional view of an embodiment of a selectively sized 4-ply paperboard.

In one embodiment, as shown in FIG. 1, the multi-ply paperboard web 100 includes four plies, the second and third plies 106, 108 being the plies containing size. For example, the second and third plies may contain from about 1 kg to about 2.5 kg size per 1 ton furnish. In one embodiment, the second and third plies contain The first and fourth plies 102, 112 do not contain size.

Figure 2:
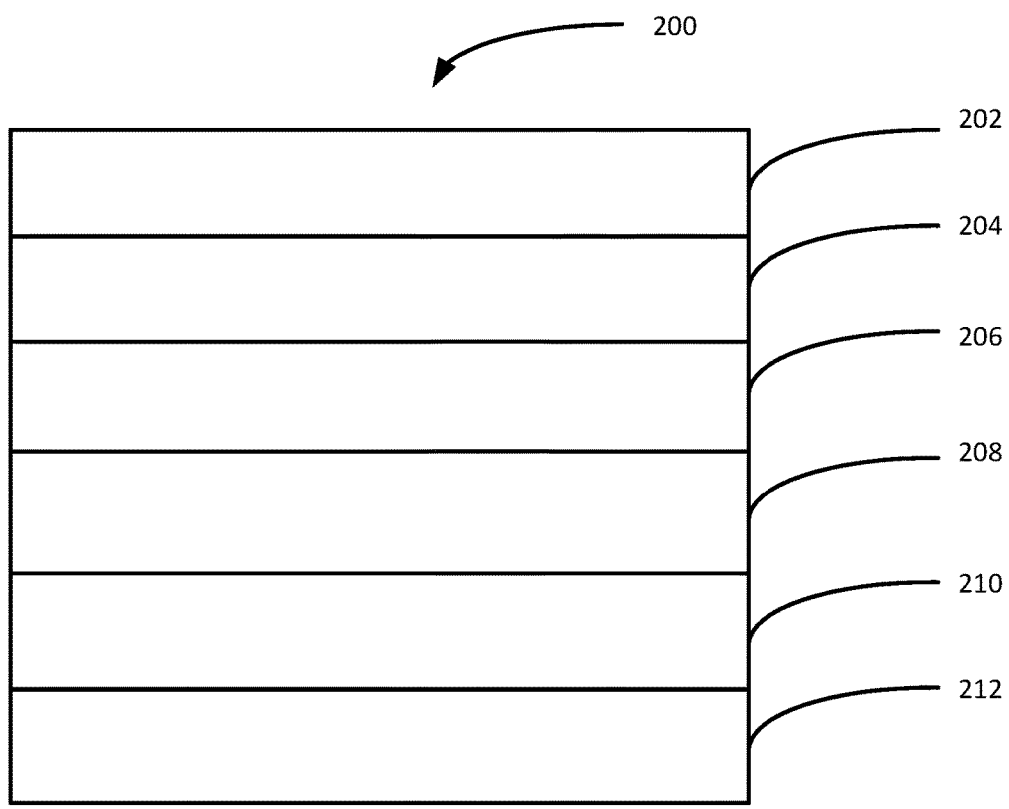
FIG. 2 is a cross-sectional view of an embodiment of a selectively sized 6-ply paperboard.

In another embodiment, as shown in FIG. 2, the multi-ply paperboard web 200 includes six plies, the second and fifth plies 204, 210 being the plies containing size. For example, the second and fifth plies may contain from about 500 g to about 1 kg size per 1 ton furnish. The first and sixth plies 202, 212 do not contain size. The third and fourth plies 206, 208 may or may not contain size.

Paper size and furnish materials are well known in the art and any suitable size and furnish materials may be used. In certain embodiments, the size is selected from the group size is selected from the group consisting of alkyl-ketene-dimer (AKD) emulsions, alkenyl-succinic-anhydride (ASA), synthetic ASA emulsifiers, alkyl ketene dimer, natural rosins, modified rosins, saponified modified rosins, wax emulsions, and combinations thereof.

In certain embodiments, the methods also include pressing the multi-ply paperboard web to remove excess moisture, drying the multi-ply paperboard web, and calendering the multi-ply paperboard web to form a multi-ply paperboard core material. The multi-ply paperboard core material may then be used to form a paperboard core.

In certain embodiments, the methods also include drying the multi-ply paperboard web to form a multi-ply paperboard core material, applying an adhesive to the multi-ply paperboard core material, and winding the multi-ply paperboard core material to form an adhesive-bonded multi-ply paperboard core.

For example, the multi-ply paperboard core material may have a basis weight of about 30 lbs/msf to about 60 lbs/msf.

Apparatus for Making Paperboard Cores

In certain embodiments, apparatus for making a multi-ply paperboard core include two or more furnish sources configured to provide a number of paperboard furnishes, wherein at least one furnish source provides paperboard furnish containing no size and at least one furnish source provides paperboard furnish containing size, and a paperboard forming section wherein the paperboard furnishes are layered to form a multi-ply paperboard web in which two outermost plies are formed of paperboard furnish containing no size and two plies adjacent the two outermost plies are formed of paperboard furnish containing size. For example, the number of furnishes may correspond to the desired number of paperboard plies. In certain embodiments each furnish source includes a fan pump for supplying the furnish to the paperboard forming section. For example, each furnish source may be a fan pump loop. Other furnish sources known in the art may also be used.

Figure 3:
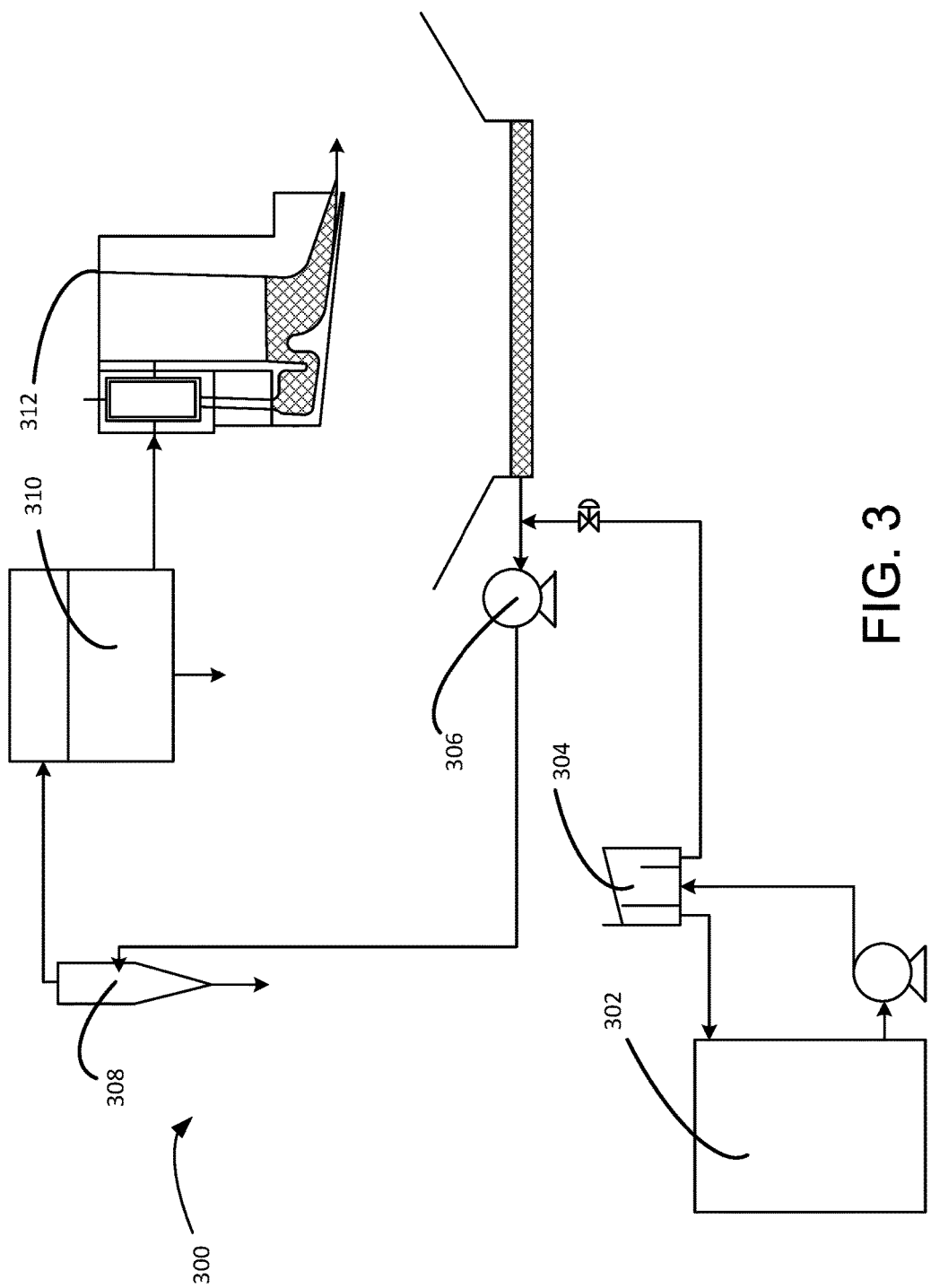
FIG. 3 is a process diagram showing an embodiment of a furnish source including a fan pump loop.

In one embodiment, as shown in FIG. 3, fan pump loop 300 is where the papermaking furnish is metered, diluted, mixed with any necessary additives, including size, and screened and cleaned, if necessary, before being discharged to the paperboard forming section. Two or more fan pump loops 300 may be provided to supply the furnishes to the paperboard forming section. For example, six fan pump loops may be provided to supply six separate furnishes for a six-ply paperboard. Alternatively, two fan pump loops may supply two furnishes (i.e., one containing size and one without size) to form a four or six-ply paperboard. In certain embodiments, each fan pump loop is in fluid connection with a headbox, each headbox being configured to provide paperboard furnish to the forming section.

In the embodiment shown in FIG. 3, fan pump loop 300 includes machine chest 302 where the pulp or fiber stock is contained. The stock is pumped to a constant head tank (i.e., stuff box) 304, from which a basis weight control valve meters the stock to be pumped through fan pump 306. The fan pump mixes the stock with the white water and supplies the blend (i.e., furnish) to the headbox 312. Size and/or other additives may be added to the stock prior to introduction to the fan pump, or during subsequent processing in the fan pump loop. The fan pump loop 300 may also include centrifugal cleaner 308 and pressure screen 310, which are used to remove contamination and debris and defloc the fibers. Once cleaned, the furnish is provided to headbox 312, from which it is supplied to the paperboard forming section.

The paperboard forming section may include any paper-forming machine known to those of skill in the art, such as one or more fourdrinier or cylinder type formers. In one embodiment, the forming section includes a multi-cylinder ultraformer, such as a four or six-cylinder ultraformer.

Figure 4:
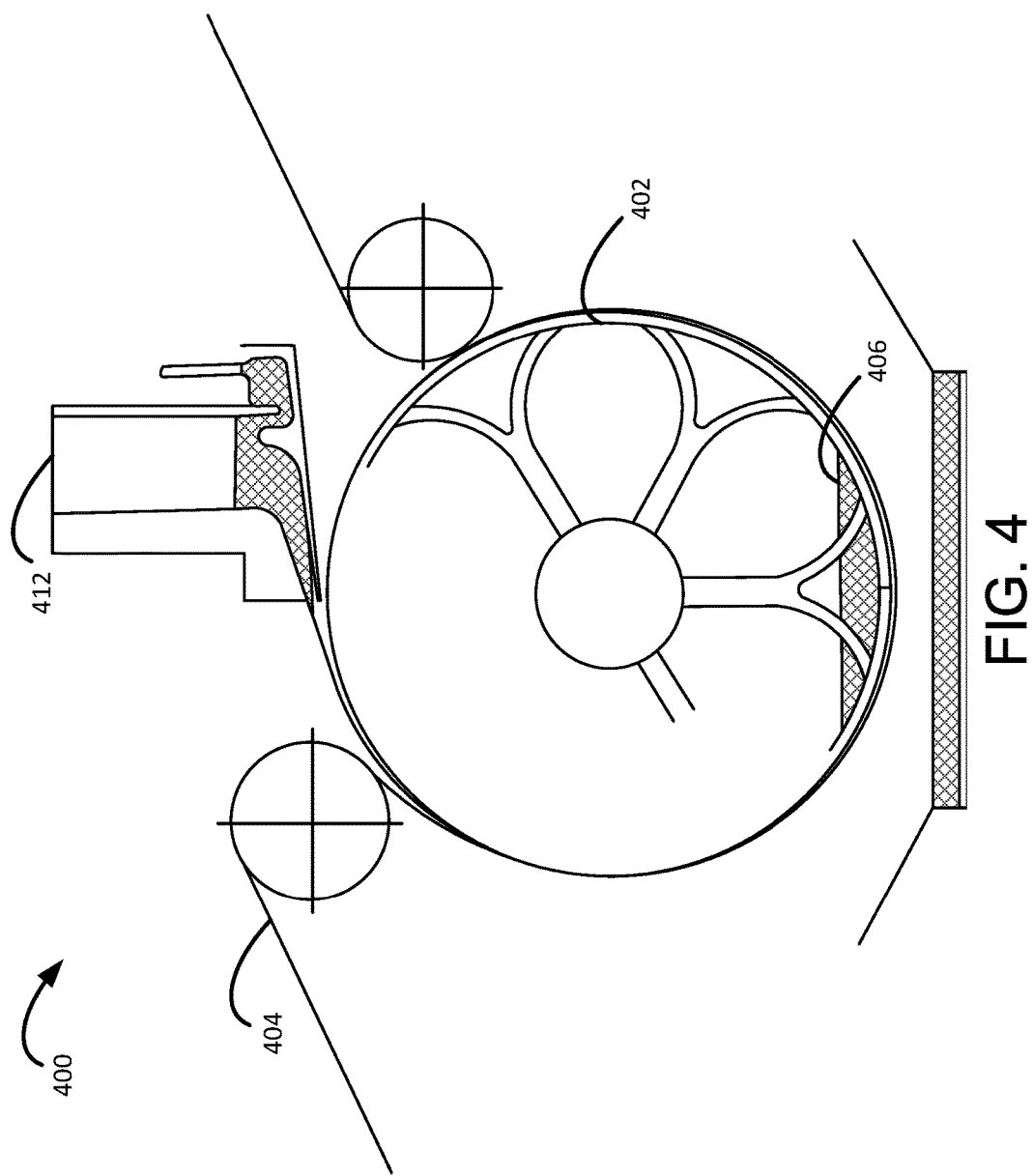
FIG. 4 is a diagram showing an embodiment of a paperboard forming section.

In one embodiment, as shown in FIG. 4, paperboard forming section 400 includes at least one ultraformer cylinder 402. In certain embodiments, the paperboard forming section includes a multi-cylinder ultraformer (i.e., includes multiple cylinders 402). As shown in FIG. 4, furnish is supplied to the forming section by headbox 412. The furnish is introduced onto a forming wire at the top of the cylinder 402. The paperboard web (i.e., furnish layer) is sandwiched between the wire and felt 404, where the increasing pressure causes dewatering. A small turbulent reservoir 406 is maintained at the point of maximum dewatering to aid in the paperboard plybonding and formation. The felt 404 and the attached web leave the cylinder and proceed to the next unit.

Figure 5:
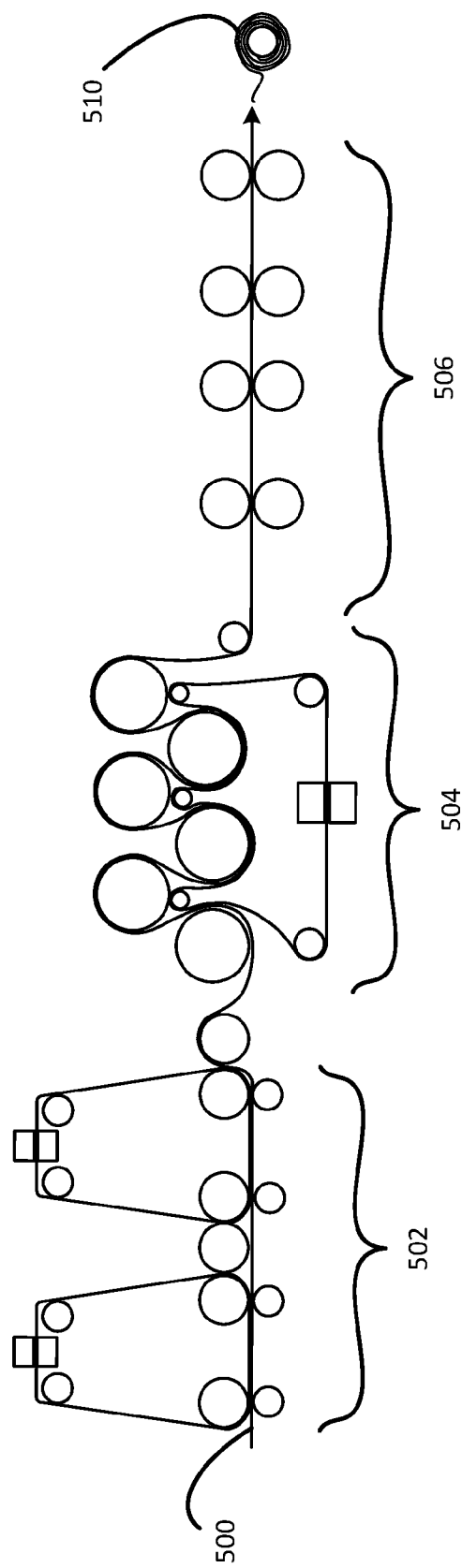
FIG. 5 is diagram showing an embodiment of a press section, a drying section, and a calender section.

In certain embodiments, as shown in FIG. 5, an apparatus also includes a press section 502 configured to remove excess moisture from the multi-ply paperboard web 500, a drying section 504, and a calender section 506 configured to smooth the multi-ply paperboard web and form a multi-ply paperboard core material 510.

Figure 6:
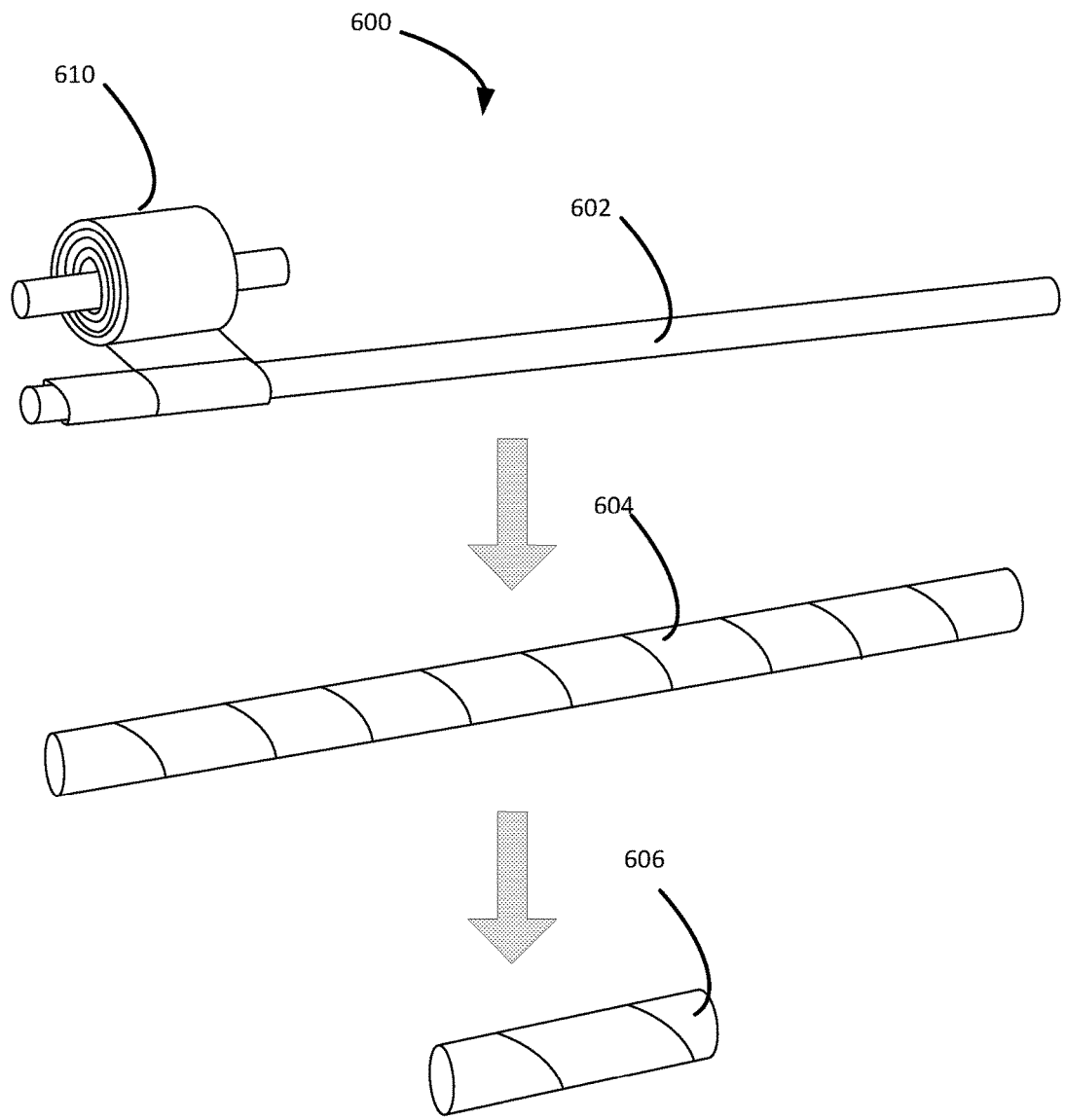
FIG. 6 is diagram showing an embodiment of a coring section and a cutting section.

In certain embodiments, as shown in FIG. 6, an apparatus also includes a coring section 600 configured to receive the multi-ply paperboard core material 610, apply an adhesive to the multi-ply paperboard core material, and wind the multi-ply paperboard core material to form an adhesive-bonded multi-ply paperboard core. The coring and adhesive application sections may include any machines and processes known in the art. For example, the adhesive may be applied to the paperboard core material 610, the material 610 may be wound around mandrel 602 to form tube 604, and tube 604 may be slit to form tube 606. The tube 606 may then be used as the core for a roll of paper towels or tissues.

In one embodiment, the adhesive may be applied to the multi-ply paperboard core material via a valve set at I to P open percentage of below 30% open.

Multi-ply paperboard cores may be made from the methods and apparatus described herein. For example, a multi-ply paperboard core may have six plies, the second and fifth plies being the plies containing size. For example, a multi-ply paperboard core may have four plies, the second and third plies being the plies containing size.

EXAMPLES

Selectively sized paperboard was made in accordance with the above-described methods. This sizing strategy resulted in a 20% to 50% reduction in glue usage during core-making, without affecting the bonding properties of the resultant cores. Without being bound by a particular theory, it is believed that sizing only the second plies on multi-ply paperboard results in more uniform and controlled glue wetting and absorption properties of the paperboard.

Trial runs using a standard core stock averaged 30 cores per minute with a glue ratio of 16 and an I to P open percentage of 100%. Trial runs using a selectively sized core stock made in accordance with the methods described herein showed the glue ratio reduced to 6 with an I to P open percentage of 24% at the same line speeds. Visual observations confirmed that the glue lasts longer in the pot without needing to be filled at the lower percentage. Overall, glue usage reduction was estimated at approximately 50% for the selectively sized paperboard stock.

Because less size is being used per volume of furnish, and less glue is necessary during coring processes with the selectively sized stock, the costs associated with sizing and coring are substantially decreased. Furthermore, glue absorption is much more consistent on the selectively sized cores, which results in a decreased need for tweaking the glue pressure by operators and a more stable overall coring process. Also, operators have found that they can run core machine lines faster because of the lower glue usage rates. That is, the selectively sized paperboard stock advantageously allows for decreased glue usage and higher production speeds during core making processes, without modification of the physical strength and bonding properties of the resulting cores.

While the disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of making a multi-ply paperboard core, comprising:
    providing a number of paperboard furnishes, the number corresponding to a desired number of paperboard plies; and
    layering the paperboard furnishes to form a multi-ply paperboard web, wherein two outermost plies are formed of paperboard furnish containing no size and two plies adjacent the two outermost plies are formed of paperboard furnish containing size.

2. The method of claim 1, further comprising:
    pressing the multi-ply paperboard web to remove excess moisture;
    drying the multi-ply paperboard web; and
    calendering the multi-ply paperboard web to form a multi-ply paperboard core material.

3. The method of claim 1, further comprising:
    drying the multi-ply paperboard web to form a multi-ply paperboard core material;
    applying an adhesive to the multi-ply paperboard core material; and
    winding the multi-ply paperboard core material to form an adhesive-bonded multi-ply paperboard core.

4. The method of claim 3, wherein the multi-ply paperboard core material has a basis weight of about 30 lbs/msf to about 60 lbs/msf.

5. The method of claim 1, wherein the size is selected from the group consisting of alkyl-ketene-dimer (AKD) emulsions, alkenyl-succinic-anhydride (ASA), synthetic ASA emulsifiers, alkyl ketene dimer, natural rosins, modified rosins, saponified modified rosins, wax emulsions, and combinations thereof.

6. The method of claim 1, wherein the multi-ply paperboard web comprises six plies, the second and fifth plies being the plies containing size.

7. The method of claim 6, wherein the second and fifth plies contain from about 500 g to about 1 kg size per 1 ton furnish.

8. The method of claim 1, wherein the multi-ply paperboard web comprises four plies, the second and third plies being the plies containing size.

9. The method of claim 8, wherein the second and third plies contain from about 1 kg to about 2 kg size per 1 ton furnish.

10. A multi-ply paperboard core made from the method of claim 3.

11. The multi-ply paperboard core of claim 10, comprising six plies, the second and fifth plies being the plies containing size.

12. The multi-ply paperboard core of claim 10, comprising four plies, the second and third plies being the plies containing size.

\* \* \* \* \*